United States Patent [19]
Kleeman et al.

[11] 3,972,809
[45] Aug. 3, 1976

[54] TREATMENT OF CONDENSATES
[75] Inventors: Thomas Kleeman; Willy Rothmayr, both of La Tour-de-Peilz, Switzerland
[73] Assignee: Societe d'Assistance Technique pour Produits Nestle S.A., Lausanne, Switzerland
[22] Filed: Dec. 11, 1973
[21] Appl. No.: 423,660

[30] Foreign Application Priority Data
Dec. 14, 1972 Switzerland.................... 18196/72

[52] U.S. Cl................................. 210/24; 426/271; 426/387; 426/432; 426/435
[51] Int. Cl.² ...................... C02B 1/42; C02B 1/56
[58] Field of Search........................ 210/24, 37, 38; 426/271, 431, 432, 435, 386, 387

[56] References Cited
UNITED STATES PATENTS

| | | | |
|---|---|---|---|
| 2,098,961 | 11/1937 | Fronmuller | 426/386 |
| 2,663,702 | 12/1953 | Kropa | 426/271 |
| 3,108,876 | 10/1963 | Turken et al. | 426/271 |
| 3,224,880 | 12/1965 | van Ike | 426/435 |
| 3,418,134 | 12/1968 | Rooker | 426/386 |
| 3,531,296 | 9/1970 | Smithies | 426/271 |

*Primary Examiner*—Charles N. Hart
*Assistant Examiner*—Ivars Cintins
*Attorney, Agent, or Firm*—Watson Leavenworth Kelton & Taggart

[57] ABSTRACT

Aqueous liquids resulting from the condensation of vapours emitted by aqueous vegetable extracts are purified by treatment with an ion exchange resin. The purified condensates may be used for the extraction of the vegetable material.

9 Claims, No Drawings

TREATMENT OF CONDENSATES

The present invention is concerned with the treatment of aqueous media containing residual substances.

Industrial effluents contain diverse substances the nature of which varies with the industry concerned, but whose polluting effect may show up in such a way that it is necessary to purify these effluents before returning them to the environment. Certain aqueous waste liquids from the food industry contain substances that are liable to exert an undesirable effect on certain characteristics of the medium into which they are discharged, in particular on the oxygen content of the aqueous medium. This is true also of the aqueous effluents produced during the extraction of vegetable materials such as coffee, chicory or tea, in particular the liquids obtained by condensation of vapours emitted by aqueous extracts during concentration operations, which contain a variety of organic substances as well as certain mineral substances.

Efforts have been made to devise different processes for purifying these aqueous waste liquids, for example by neutralisation of the organic acids, or filtration, especially on activated charcoal, but these processes are found to be of limited efficiency or are difficult to put into effect on an industrial scale.

The present invention is concerned with a particularly simple and effective process for purifying these aqueous effluents. It provides a process for purifying an aqueous liquid resulting from the condensation of vapours emitted by an aqueous extract of a vegetable material, in which the liquid is treated with at least one ion exchange resin.

Trials have shown this purification treatment considerably reduces the concentration of oxidisable substances in the aqueous liquid. Thus, for example, this concentration, expressed by the C.O.D. (Chemical Oxygen Demand) of the medium, may be reduced from 2000 ppm to a value of the order of 100 to 500 ppm.

The aqueous liquid obtained after treatment with the ion exchange resins may be either discharged as waste water or be utilised for the aqueous extraction of a fresh batch of vegetable material. This latter application is be particularly advantageous within in the production of extracts of vegetable materials such as coffee, chicory or tea. Thus, it has been found that utilising the liquid treated by the process in accordance with the invention for the aqueous extraction of the vegetable material leads to an improvement in the aromatic characteristics of the resulting product. This improvement may be explained by the fact that, during concentration of the aqueous extract by evaporation, even if extract has been subjected to preliminary stripping to recover the bulk of the desirable aromatic constituents, the vapours emitted during evaporation entrain certain aromatic constituents of the plant material that were not removed during the preliminary stripping, so that a portion of these constituents, present in the purified aqueous liquid, is re-introduced into the extraction cycle.

The purified aqueous liquid may also be used for feeding steam boilers. It is preferable, in this case, to submit the liquid to a further purification, for example by filtration on activated charcoal, before introducing it into the boiler.

The operational parameters of the process, which are enumerated below, may be selected having regard to the respective characteristics of the aqueous liquid to be purified and of the treated liquid. For example, it is possible to choose the parameters so as to obtain a purified liquid having a C.O.D. determined for example by the potassium dichromate test set out in the ASTM Standard No D 1252-58 T, not exceeding a given value, such as 300 ppm.

These parameters are the following:
i. the nature of the ion exchange resin,
ii. the amount of resin used as a ratio of the amount of liquid to be purified,
iii. the conditions of flow of the liquid through the ion exchange resin.

Anionic or cationic ion exchange resins may be chosen from the resins industrially available. Examples of resins that are particularly suitable for carrying out the process in accordance with the invention are the anionic resins, known under the designation Dowex 11, 3 or 2 or cationic resins such as Dowex 50 resin.

The appropriate quantity of resin, expressed as a proportion of the quantity of aqueous liquid to be treated, may be readily determined as a function of the purity of the purified product that it is desired to obtain. This quantity may be expressed, for example, as the maximum useful life of a given quantity of resin for a given throughput of a particular aqueous product. Thus, trials have shown that the C.O.D. of the product treated by circulation through a given quantity of resin progressively increases with time. It is therefore sufficient, having regard to the maximum C.O.D. chosen, to stop the treatment before the C.O.D. of the treated product has reached the selected limiting value and to replace the saturated resin by a fresh batch of regenerated resin. The order of magnitude of this maximum useful life may also be calculated on the basis of the absorption capacity of the resin used. Thus, for example, for a column containing 1.3 $m^3$ of a resin having an absorption capacity of 1.2 millimoles per ml of moist resin and an aqueous liquid having a C.O.D. of 2000 ppm, and which contains organic substances with an average molecular weight of about 100, a first approximation shows that this volume of resin will absorb a most 156 kg of organic substance. This volume of resin will thus be able to treat 78 tons of aqueous product, which, for a throughput of 10 tons/hour of aqueous product, gives a maximum life of the resin of the order of 8 hours.

A test carried out under the same conditions, with the C.O.D. of the treated product being determined every hour, shows that the C.O.D. progressively increases with time and, after 8 hours use of the resin, reaches values of the order of 400 to 500 ppm, depending on the nature of the aqueous product treated and that of the resin utilised.

The conditions of flow of the aqueous liquid through the ion exchange resin, provided that they represent a turbulence-free flow, are not critical in relation to the process in accordance with the invention. These conditions are governed essentially by the geometry of the column containing the ion exchange resin as well as by the throughput of the treated product. In general, it is preferred to use cylindrical columns with a height of approximately 5 to 10 times the diameter, the velocity of the aqueous fluid through the resin being of the order of 0.7 cm/s to 1.0 cm/s.

The temperature of the treatment is not critical with respect to the operation of the process, provided that it does not impair the absorption properties of the resins.

In general, it is preferable to carry out the purification treatment at ambient temperature.

The resin used may subsequently be regenerated for re-use. An anion exchange resin may be conveniently regenerated with an aqueous alkali solution, for example an aqueous sodium hydroxide solution. The appropriate quantity of alkaline solution may be calculated on the basis that the quantity of absorbed organic substances expressed, for example, in moles per liter of resin, is to be replaced by an equivalent molar quantity of alkaline substance ($OH^-$ ions). Thus, if an anionic resin having reached its absorption capacity, for example 1.2 moles per liter of resin, is regenerated then 1.2 moles of sodium hydroxide per liter of resin should be used for complete regeneration. If a column containing 1.3 m$^3$ of this anionic resin is regenerated, 1560 moles of sodium hydroxide should be supplied, that is, if an aqueous solution containing 30% by weight of sodium hydroxide is used 208 liters of solution are required. In general, it is preferable to use an excess of alkaline solution of about 20%, that is to effect the regeneration with 230 liters of solution.

If a cation exchange resin is used, it may be regenerated with an aqueous acid solution, for example an aqueous solution of hydrochloric acid. The appropriate quantity of acid solution may be determined by calculation on the basis that the molar quantity of absorbed organic substances is to be replaced by an equivalent molar quantity of acid ($H^+$ ions). For example, if an aqueous solution containing 35% by weight of hydrochloric acid is used, 1.3 m$^3$ of cation exchange resin which has absorbed its maximum of 1.2 moles per liter may be regenerated with 180 liters of solution, allowing for an approximately 20% excess.

The regeneration of the ion exchange resin may be effected by contacting the resin with the alkaline or acid solution for a period of time, of the order of 1 hour or more, that is sufficient for the absorbed organic substances to be replaced by the appropriate $OH^-$ or $H^+$ ions.

Regeneration is preferably carried out by passing the alkaline or acid solution through the resin at a rate such that the appropriate quantity of the regenerating liquid is used, for example a rate of 50 liters/hour of sodium hydroxide solution for 5 hours for 1.3 m$^3$ of the anionic resin considered above. The regenerating solution used preferably contains a concentration by weight of the alkaline or acid substance that does not exceed 30 to 35%.

After regeneration, the resin is preferably washed with water, preferably with a volume of water corresponding approximately to 5 times the volume of the washed resin, and at a rate of flow approximately equal to the rate of flow of the aqueous liquid treated.

The process in accordance with the invention may comprise successive treatments of the aqueous liquid, with similar or different types of resin. In general, it is preferable to carry out this treatment by passage through columns arranged in series and containing different types of resins, i.e. of the anionic and cationic type.

As noted, the process according to the invention is particularly suitable for the treatment of condensates resulting from concentration of aqueous coffee or chicory extracts. Before concentration, the aqueous extract is stripped and a portion of its aromatic constituents is recovered for subsequent addition to the extract after concentration. The evaporation condensate is collected and led to a purification installation comprising several batteries of columns filled with ion exchange resins. Each battery comprises two series-connected columns, with the first column containing an anionic resin and the second a cationic resin. Each battery may also comprise other cationic or anionic columns. After passage through the purification battery, the aqueous liquid is recycled to the extraction of the vegetable material. When a battery of purification columns has been operated for the maximum period determined as described previously, the aqueous liquid is led into another battery, and the saturated battery is regenerated and washed.

The invention is illustrated by the following examples. In these examples the content of organic substances in the liquid is expressed as the C.O.D. determined by the potassium dichromate test set out in ASTM standard No D 1252-58 T. This test may be described schematically in the following manner:

A sample of 50 ml of the aqueous medium is heated under reflux in the presence of 25 ml of a standard solution of potassium dichromate (0.250 N) and 75 ml concentrated sulphuric acid, and the excess potassium dichromate is titrated with ferrous ammonium sulphate. The quantity of oxidizable organic substances which is proportional to the quantity of potassium dichromate consumed, expressed in ppm, is the C.O.D. of the aqueous medium.

EXAMPLE 1

A stripped aqueous coffee extract is concentrated by evaporation and the vapours are condensed. This condensate having a C.O.D. of 1320 ppm, is fed at the rate of 20 kg/h into a purifier battery comprising the following series-connected columns:

Column 1, having a diameter of 10 cm and a height of 90 cm, containing 5 kg of "Dowex 3 large" anionic resin, Column 2, having a diameter of 10 cm and a height of 90 cm, containing 5 kg of "Dowex 50 large" cationic resin, Column 3, having a diameter of 7.5 cm and a height of 90 cm, containing 5 kg of "Dowex 3 small" anionic resin.

Two samples, 1 and 2, are withdrawn every hour between columns 2 and 3 and after the column 3 and are examined by the dichromate test. The results obtained are given in the table below:

| Time (hours) | C.O.D. (ppm) | |
|---|---|---|
| | Sample 1 | Sample 2 |
| 1 | 120 | 30 |
| 2 | 270 | 150 |
| 3 | 260 | 220 |
| 4 | 390 | 250 |
| 5 | 300 | 300 |
| 6 | 420 | 296 |
| 7 | 450 | 300 |
| 8 | 570 | 290 |

Needless to say, the C.O.D. of the product may be further reduced by again repeating the ion exchange resin treatment.

EXAMPLE 2

A condensate (C.O.D. = 1080 ppm) obtained in the concentration by evaporation of an aqueous coffee extract is passed at a rate of 20 kg/h through two series-connected ion exchange columns, each containing 5 kg of "Dowex 3 large" anionic resin. These two columns have a diameter of 10 cm and a height of 90 cm.

Samples 1 and 2 are withdrawn every hour after passage through the first column and after passage through both columns, and are examined by the dichromate test. The results obtained are shown in the table below:

| Time (hours) | C.O.D. (ppm) | |
|---|---|---|
| | Sample 1 | Sample 2 |
| 1 | 430 | 10 |
| 2 | 430 | 110 |
| 3 | 410 | 30 |
| 4 | 460 | 170 |
| 5 | 510 | 270 |
| 6 | 510 | 280 |
| 7 | 490 | 340 |
| 8 | 510 | 390 |

EXAMPLE 3

A condensate resulting from the concentration by evaporation of an aqueous extract of chicory, with a C.O.D. of 1400 ppm, is passed at the rate of 20 kg/h through a purification battery consisting of three series-connected columns having the following characteristics:

Column 1: diameter = 7.5 cm, height = 90 cm, containing 3 kg "Dowex 3 small" anionic resin, Column 2: diameter = 10 cm, height = 90 cm, containing 5 kg "Dowex 3 large" anionic resin, Column 3: same dimensions as column 1, containing 5 kg "Dowex 50 large" cationic resin.

Two samples, 1 and 2, are withdrawn every hour at the exit of the 2nd and 3rd columns and are examined by the dichromate test.

The results are shown in the table below:

| Time (hours) | C.O.D. (ppm) | |
|---|---|---|
| | Sample 1 | Sample 2 |
| 1 | 165 | 40 |
| 2 | 335 | 230 |
| 3 | 435 | 270 |
| 4 | 565 | 500 |
| 5 | 545 | 450 |
| 6 | 550 | 540 |
| 7 | 605 | 510 |
| 8 | 585 | 560 |

EXAMPLE 4

The purified aqueous liquid obtained in Example 1 is recycled to the aqueous extraction of coffee. It is heated to a temperature of 180°C and added continuously to the water used for extraction in the proportion of 50% by volume. The purification battery is changed after operating for 8 hours, the resins used being given the following regeneration treatment:

i. "Dowex 3 large" anionic resin (Column 1). Circulation of a 30% by weight aqueous solution of sodium hydroxide for 30 minutes at a rate of 5 liters/hour, at 20°C. Water wash at 20°C for 70 minutes at a flow rate of 20 liters/hour.

ii. "Dowex 50 large" cationic resin (Column 2). Circulation of a 35% by weight aqueous hydrochloric acid solution for 30 minutes at 20°C at a rate of 5 liters/hour. Water wash at 20°C for 70 minutes at a flow rate of 20 liters/hour.

iii. "Dowex 3 small" anionic resin (Column 3). Circulation of a 30% by weight aqueous sodium hydroxide solution for 18 minutes at 20°C at a rate of 5 liters/hour. Water wash at 20°C at a flow rate of 20 liters/hour.

The aqueous extract obtained by extraction using purified condensate is concentrated and freeze-dried. For comparison purposes, reconstitutes beverages are prepared starting from an extract obtained as described in this Example, and from an extract obtained under identical conditions, but without recycling of the purified condensate. The beverages, reconstituted in the proportion of 17 g extract per liter of hot water, are submitted in a triangle test to a panel of 10 trained tasters. 8 tasters resolved the triangle, and assessed the flavour of the beverage obtained from the extract prepared with recycled condensate to be fuller than the control.

We claim:

1. In a process for the treatment of aqueous extract of vegetable material selected from the group consisting of coffee, tea, and chicory wherein said extract is stripped to recover aromatic constituents and then subjected to concentration by evaporation, and wherein incident to said concentration vapours are emitted by said extract and are then condensed to form an aqueous liquid, the improvement which comprises purifying said condensed liquid through contact with at least one ion exchange resin.

2. A process according to claim 1, in which the aqueous liquid is contacted with an anion exchange resin and then with a cation exchange resin.

3. A process according to claim 2, in which after contact of the condensed aqueous liquid with at least one ion exchange resin, said liquid is utilized for preparing an extract of vegetable material.

4. A process according to claim 1, in which the vegetable material is coffee.

5. A process according to claim 1 in which the vegetable material is tea.

6. A process according to claim 1 in which the vegetable material is chicory.

7. A process according to claim 1, in which after contact of the condensed aqueous liquid with at least one ion exchange resin, said liquid is utilized for preparing an extract of vegetable material.

8. A process according to claim 1, in which the aromatic constituents recovered by stripping are returned to the extract after said extract has been concentrated.

9. A process according to claim 1, in which the condensed aqueous liquid is purified by reduction of its concentration of oxidisable vegetable material substances.

* * * * *

UNITED STATES PATENT AND TRADEMARK OFFICE
CERTIFICATE OF CORRECTION

PATENT NO. : 3,972,809

DATED : August 3, 1976

INVENTOR(S) : Thomas Kleemann; Willy Rothmayr

It is certified that error appears in the above–identified patent and that said Letters Patent are hereby corrected as shown below:

On the first page of the patent, please change the spelling of the first inventor's name from "Kleeman" to --Kleemann--.

Signed and Sealed this

Fifth Day of June 1979

[SEAL]

Attest:

RUTH C. MASON
*Attesting Officer*

DONALD W. BANNER
*Commissioner of Patents and Trademarks*